United States Patent
Peng et al.

(10) Patent No.: US 10,101,827 B2
(45) Date of Patent: Oct. 16, 2018

(54) METHOD AND APPARATUS FOR CONTROLLING A TOUCH-SCREEN BASED APPLICATION PORTED IN A SMART DEVICE

(71) Applicant: Alibaba Group Holding Limited, Grand Cayman (KY)

(72) Inventors: Wei Peng, Hangzhou (CN); Cheng Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 367 days.

(21) Appl. No.: 14/799,225

(22) Filed: Jul. 14, 2015

(65) Prior Publication Data
US 2016/0018909 A1   Jan. 21, 2016

(30) Foreign Application Priority Data

Jul. 16, 2014   (CN) .......................... 2014 1 0339814

(51) Int. Cl.
| G06F 3/048 | (2013.01) |
| H04N 5/44 | (2011.01) |
| H04N 21/00 | (2011.01) |
| G06F 3/038 | (2013.01) |
| G06F 3/0489 | (2013.01) |
| H04N 5/445 | (2011.01) |

(52) U.S. Cl.
CPC .......... G06F 3/0383 (2013.01); G06F 3/0489 (2013.01); H04N 5/44 (2013.01); H04N 5/445 (2013.01)

(58) Field of Classification Search
CPC .. G06F 3/00; G06F 3/048; H04N 5/44; H04N 21/41
See application file for complete search history.

(56) References Cited

U.S. PATENT DOCUMENTS

| 2003/0067484 | A1* | 4/2003 | Moir ................. G06F 17/30899 715/747 |
| 2003/0197744 | A1 | 10/2003 | Irvine |
| 2004/0208488 | A1 | 10/2004 | Fuchigami et al. |
| 2004/0208588 | A1 | 10/2004 | Colmenarez et al. |
| 2007/0271267 | A1 | 11/2007 | Lim et al. |
| 2008/0288878 | A1 | 11/2008 | Hayashi et al. |
| 2009/0027334 | A1 | 1/2009 | Foulk et al. |
| 2010/0011377 | A1* | 1/2010 | Imai ........................ G06F 9/445 719/318 |
| 2010/0083338 | A1* | 4/2010 | Chiang ................ H04N 5/4403 725/139 |

(Continued)

OTHER PUBLICATIONS

PCT Search Report and Written Opinion dated Oct. 1, 2015 for PCT Application No. PCT/US15/40376, 10 pages.

*Primary Examiner* — Hugo Molina
(74) *Attorney, Agent, or Firm* — Lee & Hayes, PLLC (57) ABSTRACT

A method and an apparatus for controlling an application ported in a smart device include receiving a key signal of a triggered key that is sent by a control apparatus of the smart device; obtaining image information corresponding to the triggered key of the control apparatus from a pre-stored correspondence relationship between the key and the image information based at least in part on the key signal; determining a matched image from a currently displayed view based at least in part on the image information; and simulating a click event on the matched image.

14 Claims, 7 Drawing Sheets

(56) References Cited

U.S. PATENT DOCUMENTS

| | | | |
|---|---|---|---|
| 2010/0122207 A1* | 5/2010 | Kim | G06F 3/0481 715/788 |
| 2011/0019921 A1 | 1/2011 | Hamada | |
| 2011/0271183 A1 | 11/2011 | Bose et al. | |
| 2011/0304778 A1* | 12/2011 | Roberts | G08C 17/02 348/734 |
| 2012/0200400 A1 | 8/2012 | Arling et al. | |
| 2012/0299815 A1* | 11/2012 | Kim | H04N 21/4126 345/156 |
| 2013/0035941 A1* | 2/2013 | Kim | G06F 3/017 704/275 |
| 2013/0054954 A1* | 2/2013 | Lee | H04N 21/4432 713/2 |
| 2013/0086577 A1* | 4/2013 | Nakashima | H04N 21/25808 717/178 |
| 2013/0129312 A1* | 5/2013 | Tanikawa | G11B 27/34 386/234 |
| 2013/0145048 A1 | 6/2013 | Lee et al. | |
| 2013/0314383 A1* | 11/2013 | Jung | H04N 21/42222 345/184 |
| 2014/0104494 A1* | 4/2014 | Begeja | H04N 5/44591 348/564 |
| 2014/0132497 A1* | 5/2014 | Kolehmainen | G08C 17/02 345/156 |
| 2014/0168523 A1* | 6/2014 | Kwak | H04N 5/4403 348/734 |
| 2014/0191982 A1 | 7/2014 | Guo | |
| 2015/0293677 A1* | 10/2015 | Fong | H04L 65/4084 715/717 |
| 2015/0309669 A1* | 10/2015 | Wheeler | G06F 3/0482 715/716 |
| 2015/0309670 A1* | 10/2015 | Wheeler | G06F 3/0482 715/716 |
| 2015/0326909 A1* | 11/2015 | Eun | H04N 21/4126 725/38 |
| 2016/0301699 A1* | 10/2016 | Wang | H04L 63/10 |

\* cited by examiner

METHOD AND APPARATUS FOR CONTROLLING A TOUCH-SCREEN BASED APPLICATION PORTED IN A SMART DEVICE

CROSS REFERENCE TO RELATED PATENT APPLICATION

This application claims foreign priority to Chinese Patent Application No. 201410339814.8 filed on Jul. 16, 2014, entitled "Method and Apparatus of Controlling Smart Device", which is hereby incorporated by reference in its entirety.

TECHNICAL FIELD

The present disclosure relates to the technological field of smart devices, and more particularly, to methods and apparatuses of controlling a smart device.

BACKGROUND

Recently, most applications (APPs), such as games, are developed based on touch-screen smart phones or Personal Digital Assistants (PDAs). Generally, an interaction mode used by these games is a screen touching mode. If these games that support the screen touching mode are transplanted into a smart television for running, a joystick is needed for operations. However, existing games that can be played on a smart phone or PAD through touch operations do not support other operation modes, and users cannot transplant the games that support the touching mode into a smart television.

Recently, an operation mode of a game can be changed by modifying the source code of the game to enable the game to support an operation mode using a joystick. However, this requires modification of the source codes of all the games that support the screen touching mode resulting in a large amount of workload and a high development cost.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure aims to solve a technical problem in related technologies at least to a certain extent.

Accordingly, a first objective of the present disclosure is to provide a method of controlling a smart device. The method can solve problems regarding a touch-screen based application of a mobile terminal failing to support a joystick operation and the need of modification of the code of the application after the application is ported to a smart television system, thus reducing the cost of developing the application.

A second objective of the present disclosure is to provide an apparatus of controlling a smart device.

To achieve the above objectives, in the first aspect, an embodiment of the present disclosure provides a method of controlling a smart device, which includes: receiving a key signal of a triggered key that is sent from a control apparatus of the smart device; obtaining image information corresponding to the triggered key of the control apparatus from a pre-stored correspondence relationship between keys and image information based on the key signal; determining a matched image from a currently displayed view based on the image information; and simulating a click event on the matched image.

The example method of controlling a smart device obtains image information corresponding to a triggered key of a control apparatus from a pre-stored correspondence relationship between keys and image information based on a key signal of the triggered key that is sent from the control apparatus of the smart device, determines a matched image from a currently displayed view based on the image information, and simulates a click event on the matched image, thus solving the problems regarding a touch-screen based application of a mobile terminal failing to support a joystick operation and the need of modification of the code of the application after the application is ported to a smart television system, thus reducing the cost of developing the application and enabling the user to control the application via the control apparatus.

To achieve the above objectives, in a second aspect, an embodiment of the present disclosure provides an apparatus of controlling a smart device, which includes: a receiving module to receive a key signal of a triggered key that is sent by a control apparatus of the smart device; an acquisition module to obtain image information corresponding to the triggered key of the control apparatus from a pre-stored correspondence relationship between keys and image information based on the key signal; a determination module to determine a matched image from a currently displayed view based on the image information; and a click module to simulate a click event on the matched image.

The example apparatus of controlling a smart device receives a key signal of a triggered key that is sent by a control apparatus of the smart device via the receiving module. The acquisition module obtains image information corresponding to the triggered key from a pre-stored correspondence relationship between keys and image information based on the key signal. The determination module determines a matched image from a currently displayed view according to the image information, and the click module simulates a click event on the matched image. This solves the problems regarding a touch-screen based application of a mobile terminal failing to support a joystick operation and the need of modification of the code of the application after the application is ported to a smart television system, thus reducing the cost of developing the application and enabling the user to control the application via the control apparatus.

DETAILED DESCRIPTION

Embodiments of the present disclosure are described in detail herein. Examples of the embodiments are illustrated in the drawings, where the same or similar reference numbers represent the same or similar elements or elements having the same or similar functions. The embodiments described with reference to the drawings hereinafter are exemplary for explaining the present disclosure merely, and should not be construed as limitations to the present disclosure.

A method and an apparatus of controlling a smart device according to the embodiments of the present disclosure are described with reference to the accompanying drawings hereinafter.

Figure 1:
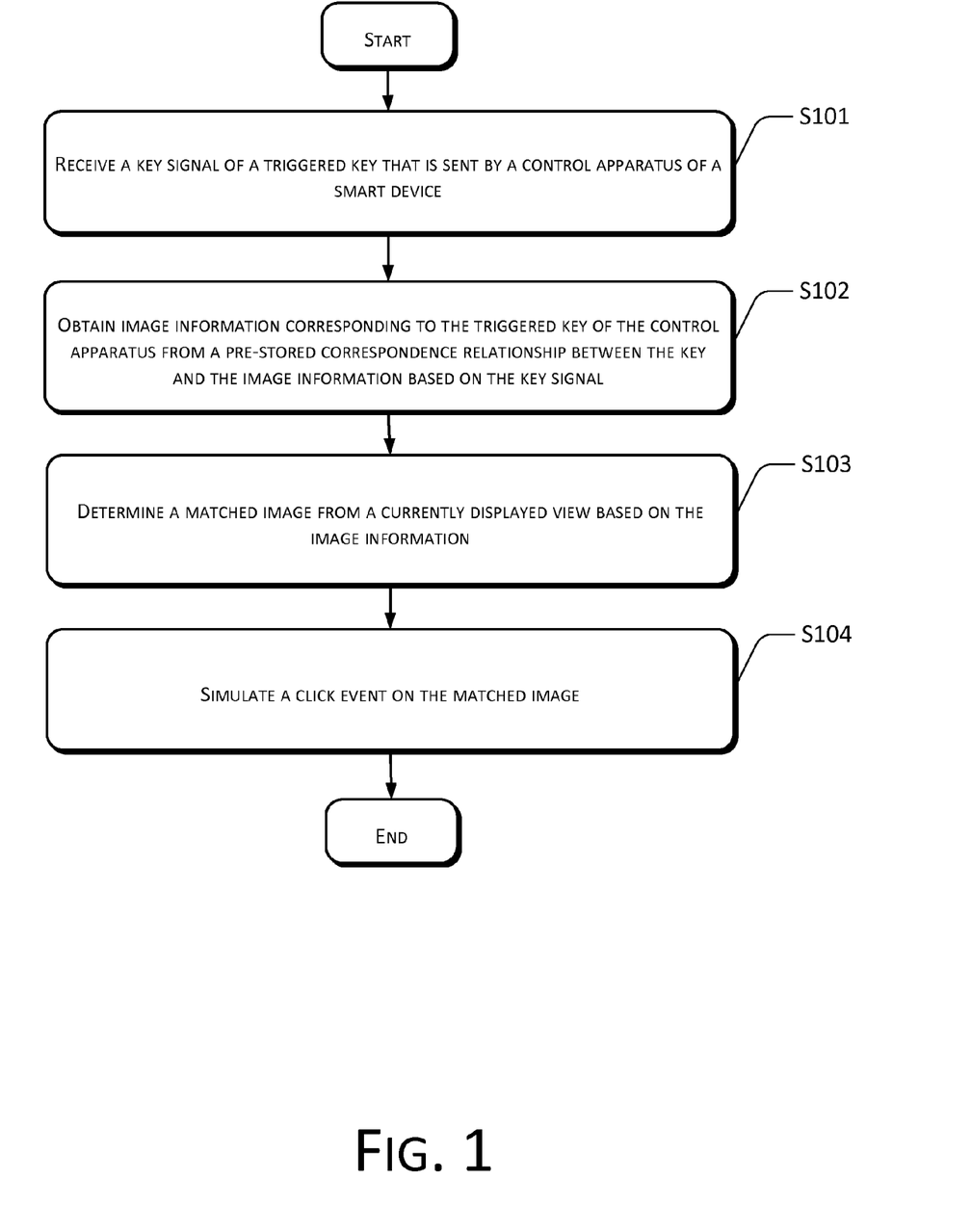
FIG. 1 is a flowchart of a method of controlling a smart device according to an embodiment of the present disclosure.

FIG. 1 is a flowchart of a method of controlling a smart device according to an embodiment of the present disclosure. As shown in FIG. 1, the method includes:

S101 receives a key signal of a triggered key that is sent by a control apparatus of a smart device.

In this embodiment, a smart television is used as an example of the smart device for description. A system of the smart television may be an Android system or an Internetwork Operating System (IOS), and this embodiment does not impose any limitation on an operating system of the smart television.

The control apparatus is an apparatus that can control the smart device. Moreover, the control apparatus includes a plurality of keys, with each key corresponding to a different key value. Specifically, monitoring is performed as to whether a key in the control apparatus of the smart device is triggered. In response to detecting that a key in the control apparatus is triggered, a key signal of the triggered key that is sent by the control apparatus of the smart device is received.

Figure 2:
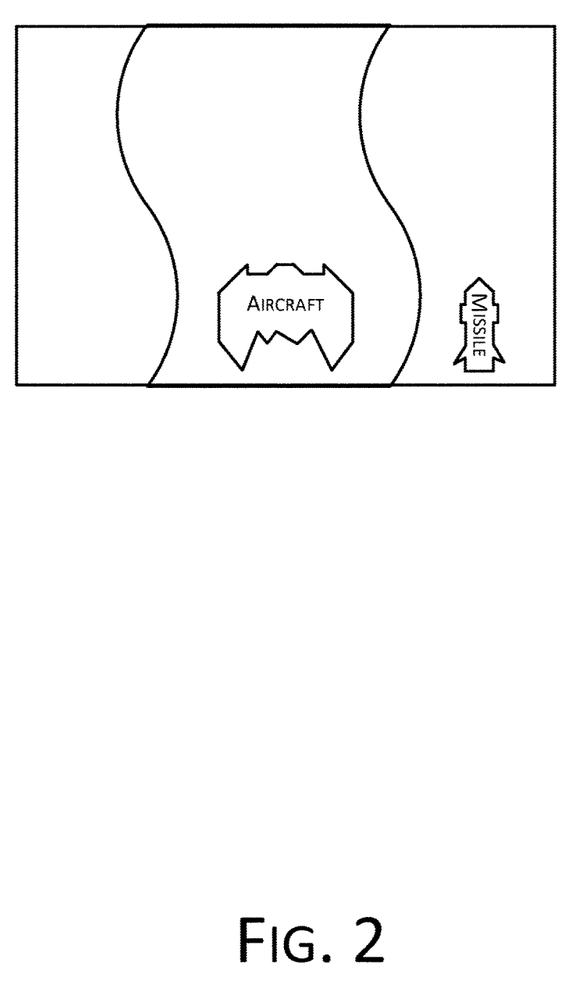
FIG. 2 is a schematic diagram of an interface of an application in a smart device according to an embodiment of the present disclosure.

For example, when a user plays a game as shown in FIG. 2 in the smart television, the control apparatus may be a joystick. The joystick includes keys such as A, B, X, Y, Up, Down, Left, and Right. If the user triggers a key of the joystick, for example, the key A, a key signal corresponding to the triggered key A that is sent by the joystick is received.

S102 obtains image information corresponding to the triggered key of the control apparatus from a pre-stored correspondence relationship between the key and the image information based on the key signal.

The stored correspondence relationship between the key and the image information may correspond to an identifier of an application (APP). In other words, different applications correspond to different correspondence relationships between keys and image information, and the correspondence relationships between the keys and the image information that correspond to different applications may be distinguished via identifiers of the applications.

Specifically, in response to receiving the key signal of the triggered key that is sent by the control apparatus of the smart device, an identifier of an application (APP) corresponding to an image currently displayed by the smart device may be acquired. Based on the identifier of the application, image information corresponding to the triggered key of the control apparatus is acquired from a correspondence relationship corresponding to the identifier, that is, a pre-stored correspondence relationship between the key and the image information.

In order to acquire the image information corresponding to the triggered key of the control apparatus from the pre-stored correspondence relationship between the key and the image information, the correspondence relationship between the key and image information may also be stored in advance. Specifically, a guide interface for setting correspondence relationship(s) may be displayed on the smart device. The user may select a key corresponding to an image according to a prompt in a guide page. A method used by the user to select a correspondence relationship between an image and a key may include: receiving a key inputted by the user for an image selected on the guide interface, and storing a correspondence relationship between the key and image information of the image. It should be noted that an identifier of an application currently corresponding to the guide interface may further be acquired when the key inputted by the user for the image selected on the guide interface is received, and the identifier of this current application is stored when the correspondence relationship between the key and the image information of the image is stored.

If the image information includes only feature image(s), a corresponding feature image may also be extracted from the current application (APP) based on different feature extraction methods before the correspondence relationship between the key and the feature image is stored, and the correspondence between the key and the feature image is then stored.

If the image information includes feature image(s) and position information of the feature image(s) on a screen of the smart device, a feature image and position information of the feature image on the screen of the smart device may also be extracted from the current APP based on different feature extraction methods before the correspondence relationship between the key and the position information of the feature image on the screen of the smart device is stored.

A process of extracting a feature image and position information of the feature image on a screen of a smart device is described herein using an exemplary implementation.

A game in a smart television as shown in FIG. 2 is used as an example. If a missile in FIG. 2 is a feature image and a key selected by a user to be corresponding to this feature image is key A, a frame of an image including the missile as shown in FIG. 2 may be captured and position information corresponding to the missile is captured based on the frame of the image when the feature image and position information of the feature image in the smart device are extracted. After the feature image and the position information of the feature image in the smart television are acquired, a one-to-one correspondence relationship among a key value corresponding to key A, the missile and the position information of the missile in the smart television may be stored. The one-to-one correspondence relationship may further be stored in a network database. Moreover, when performing the storing, an identifier corresponding to the game also needs to be stored. In this way, the user may set a correspondence relationship between a key and an image according to his/her preference and usage habit, thus improving the user experience.

In an embodiment, an image corresponding to a control object that is able to respond to a click event may be selected as the image for which the correspondence relationship is established. For example, the missile image in FIG. 2 is a control object that is able to respond to a click event. In other words, when the user click on an icon of the missile, a corresponding function may be triggered. In an example implementation, in order to establish a correspondence relationship between a key and an image corresponding to a control object, a correspondence relationship between information of the image and the control object that is able to respond to a click event may further be established before the correspondence relationship between the key and the image information of the image is stored. By establishing the correspondence relationship between the image information and the control object that is able to respond to a click event, the click event may be simulated by the control object that corresponds to the image information when a click operation occurs on the image information.

In addition, in an embodiment, after the user stores the correspondence relationship between the key and the image information and before the image information corresponding to the triggered key of the control apparatus is acquired, the method further includes: displaying a guide interface for setting correspondence relationship(s), the guide interface including an initial correspondence relationship between the key and the image information, receiving an instruction from the user for modifying the initial correspondence relationship, and storing a modified correspondence relationship between the key and the image information of the image. The initial correspondence relationship may be a correspondence relationship automatically generated by the system or a correspondence relationship that is previously modified by the user.

Figure 3A:
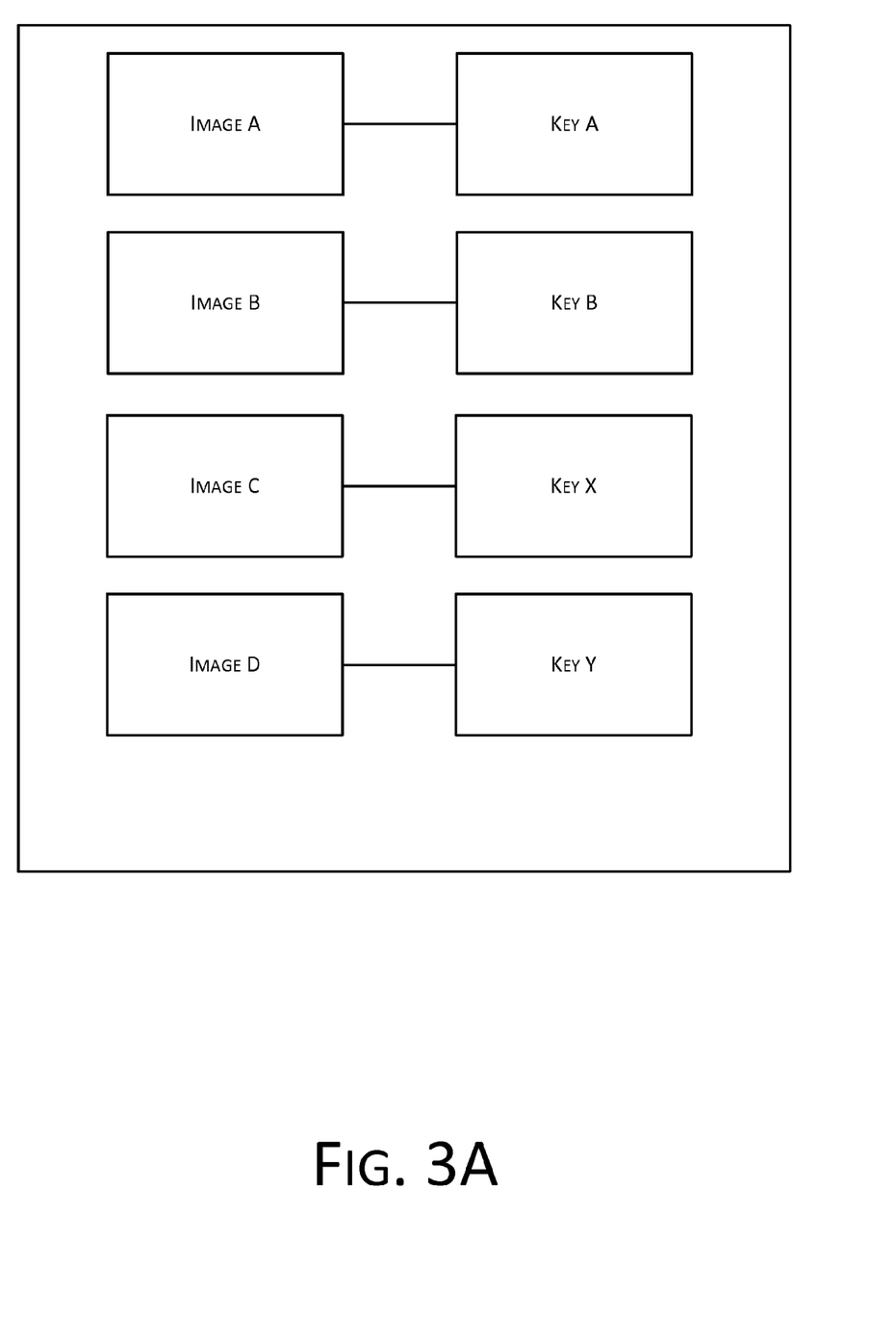
FIG. 3A is a first schematic diagram of a correspondence relationship between keys and image information in a guide interface according to an embodiment of the present disclosure.
Figure 3B:
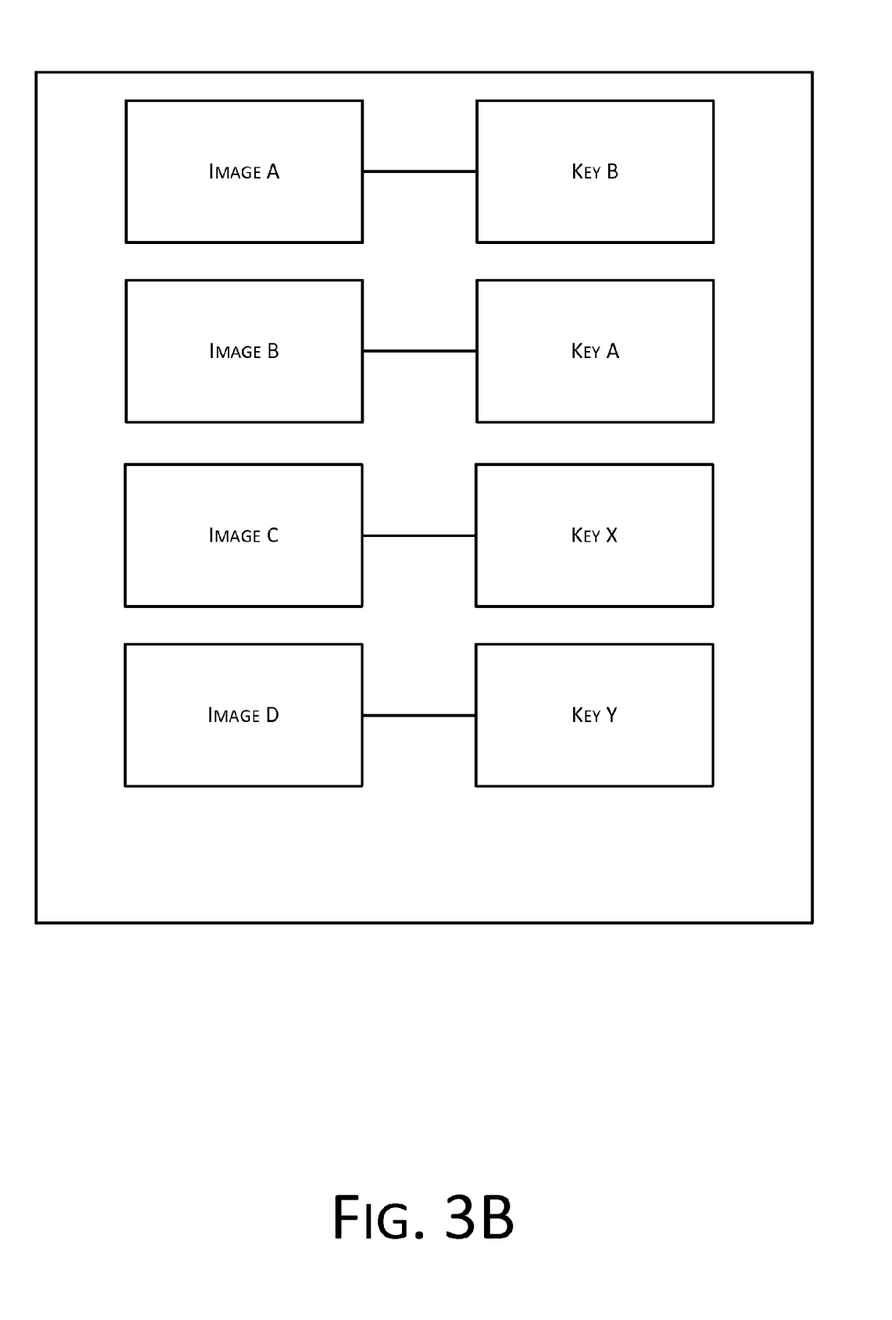
FIG. 3B is a second schematic diagram of a correspondence relationship between keys and image information in a guide interface according to an embodiment of the present disclosure.

Specifically, after the user inputs a one-to-one correspondence relationship between the key and the image information as shown in FIG. 3A on the guide interface, the user may further modify correspondence relationship(s) between key(s) and respective image information according to a need thereof if the user finds that the established correspondence relationship(s) between the key(s) and the respective image information do(es) not meet his/her use habit when using the operation apparatus to control the application (APP). For example, the user may have set up correspondence relationships between images and keys as shown in FIG. 3A. If the user finds that it is more comfortable to control image A using key B and control image B using key A during operation, the user may modify the key corresponding to image A from key A to key B and modify the key corresponding to image B from key B to key A via guide page(s) of associated correspondence relationships. The one-to-one correspondence relationships between the keys and the respective image information after modification by the user are shown in FIG. 3B. In this way, a user may set up a correspondence relationship between a key and an image region according to his/her usage habit, thus improving the user experience.

S103 determines a matched image from a currently displayed view based on the image information.

Specifically, if the image information includes a feature image, an image that is matched with the feature image may be determined from a currently displayed view based on the feature image. For example, an image that is matched with the feature image may be recognized from the currently displayed view by using an image recognition method.

If the image information includes a feature image and position information of the feature image on a screen of the smart device, an image at a corresponding position in the view currently displayed by the smart device may be obtained according to the position information, and an image that is matched with the feature image may then be determined from the obtained image.

Specifically, according to the position information of the feature image in the smart device, an image at a corresponding position in the view currently displayed by the smart device may be captured. After the image at the corresponding position is captured, similarity between the image and the feature image may be calculated using a similarity measure algorithm. The similarity measure algorithm may include a cross-correlation matching algorithm. The cross-correlation matching algorithm is a conventional matching algorithm, which determines a degree of matching between the feature image and the image captured from a current picture by calculating a cross-correlation measure value therebetween, that is, determines a degree of similarity between the feature image and the image captured from the current picture according to a magnitude of the cross-correlation measure value. A larger cross-correlation measure value indicates a higher degree of similarity between the two images.

In an embodiment, NC(i,j) may be used to represent a cross-correlation measure value, where i represents an image captured from a current image and j represents a feature image. A formula for calculating the cross-correlation measure value NC(i,j) is given as follows:

$$NC(i, j) = \frac{\sum_{m=1}^{M} \sum_{n=1}^{N} T(m, n) S(m, n)}{\sqrt{\sum_{m=1}^{M} \sum_{n=1}^{N} T^2(m, n)} \sqrt{\sum_{m=1}^{M} \sum_{n=1}^{N} S^2(m, n)}}$$

where T(m,n) is a pixel value at row m and column n of the feature image; and S(m,n) is a pixel value at row m and column n of the captured image.

After the cross-correlation measure value NC(i,j) between the feature image and the image captured from the current picture is obtained, a determination is made that the obtained image is matched with the feature image if the calculated cross-correlation measure value NC(i,j) is greater than a preset threshold, e.g., 0.8.

S104 simulates a click event on the matched image.

Specifically, upon determining the image that is matched with the feature image, a single-click or double-click event may be simulated on the matched image. In other words, a single-click or double-click event may be simulated for a control object which is able to simulate a click event. Upon simulating the click, a response to the corresponding single-click or double-click event is made.

For example, the smart television displays a picture of a flight game as shown in FIG. 2, and the joystick includes keys A, B, X, Y, Up, Down, Left and Right, where a function of the missile on the right side of the picture is to accelerate the aircraft. When the smart television displays the picture as shown in FIG. 2, the user presses key A of the joystick, which corresponds to the missile on the right side of the flight game. In response to determining that similarity between an image captured from a view currently displayed by the smart television and a feature image corresponding to key A is greater than 0.8, for example, a click event may be simulated on the captured image. Specifically, a click event may be simulated on a control object corresponding to the aircraft for which a click event may be simulated, and a response to the click event according to a function corresponding to the image, i.e., accelerating the aircraft in FIG. 2, is made.

The foregoing embodiments of the method of controlling a smart device obtain image information corresponding to a triggered key of a control apparatus from a pre-stored correspondence relationship between the key and the image information based on a key signal of the triggered key that is sent by the control apparatus of the smart device, determine a matched image from a currently displayed view based on the image information, and simulate a click event on the matched image, which solves the problems regarding a touch-screen based application of a mobile terminal failing to support a joystick operation and the need of modification of the code of the application after the application is ported to a smart television system, thus reducing the cost of developing the application and enabling the user to control the application via the control apparatus.

In order to implement the foregoing embodiments, the present disclosure further provides an apparatus of controlling a smart device.

Figure 4:
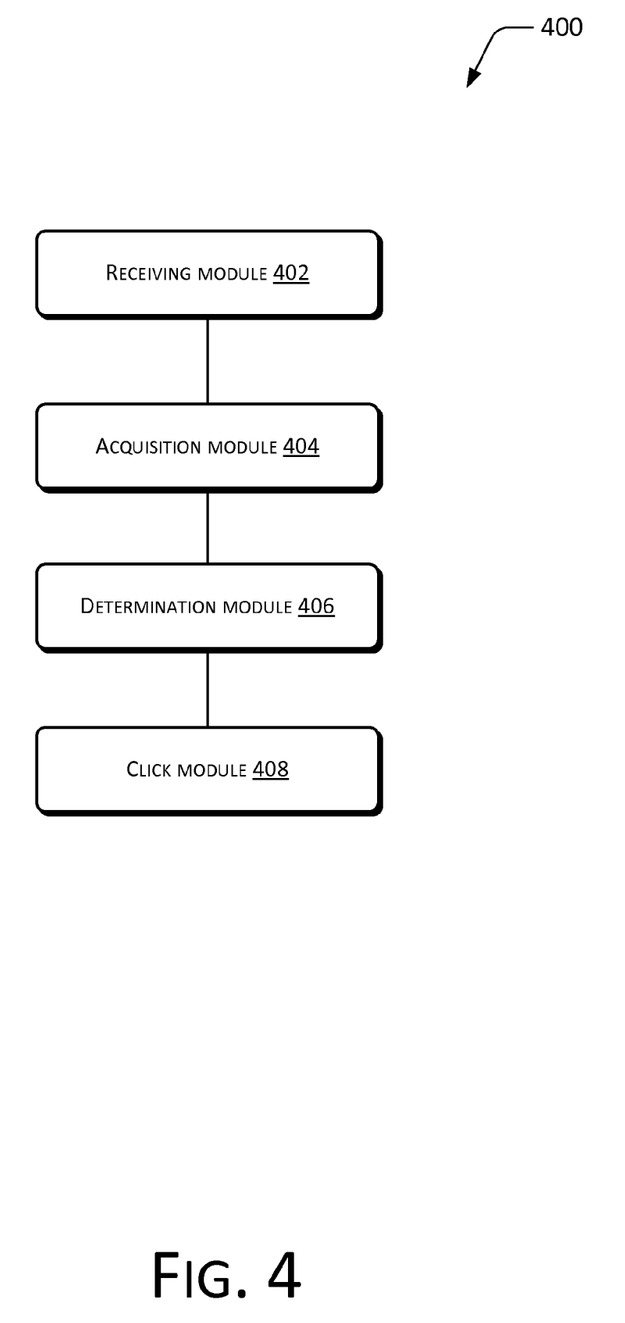
FIG. 4 is a schematic structural diagram of an apparatus of controlling a smart device according to an embodiment of the present disclosure.

FIG. 4 is a schematic structural diagram of an apparatus 400 of controlling a smart device according to an embodiment of the present disclosure. As shown in FIG. 4, the apparatus 400 includes: a receiving module 402, an acquisition module 404, a determination module 406 and a click module 408.

The receiving module 402 is configured to receive a key signal of a triggered key that is sent by a control apparatus of the smart device. The acquisition module 404 is configured to acquire image information corresponding to the triggered key of the control apparatus from a pre-stored correspondence relationship between the key and the image information based on the key signal. The determination module 406 is configured to determine a matched image from a currently displayed view based on the image information. The click module 408 is configured to simulate a click event on the matched image.

In an embodiment, a smart television is used as an example of the smart device. A system of the smart television may be an Android system or an Internetwork Operating System (IOS). This embodiment has no limitation on an operating system of the smart television.

The control apparatus is an apparatus that is able to control the smart device, and the control apparatus includes a plurality of keys, with each key corresponding to a different key value. Specifically, monitoring is performed as to whether a key in the control apparatus of the smart device is triggered. In response to detecting that a key in the control apparatus is triggered, the receiving module 402 receives a key signal of the triggered key that is sent by the control apparatus of the smart device.

The correspondence relationship corresponds to an identifier of an application (APP). The acquisition module 404 is configured to obtain an identifier of an APP corresponding to a picture currently displayed by the smart device, and obtains image information corresponding to the triggered key from a correspondence relationship corresponding to the identifier, i.e., from a pre-stored correspondence relationship between the key and the image information, based on the identifier.

When the image information includes a feature image, the determination module 406 is configured to determine an image that is matched with the feature image from a currently displayed view based on the feature image.

When the image information includes a feature image and position information of the feature image on a screen of the smart device, the determination module 406 is configured to: obtain an image at a corresponding position in a view currently displayed by the smart device based on the position information, and determine an image that is matched with the feature image in the obtained image.

Figure 5:
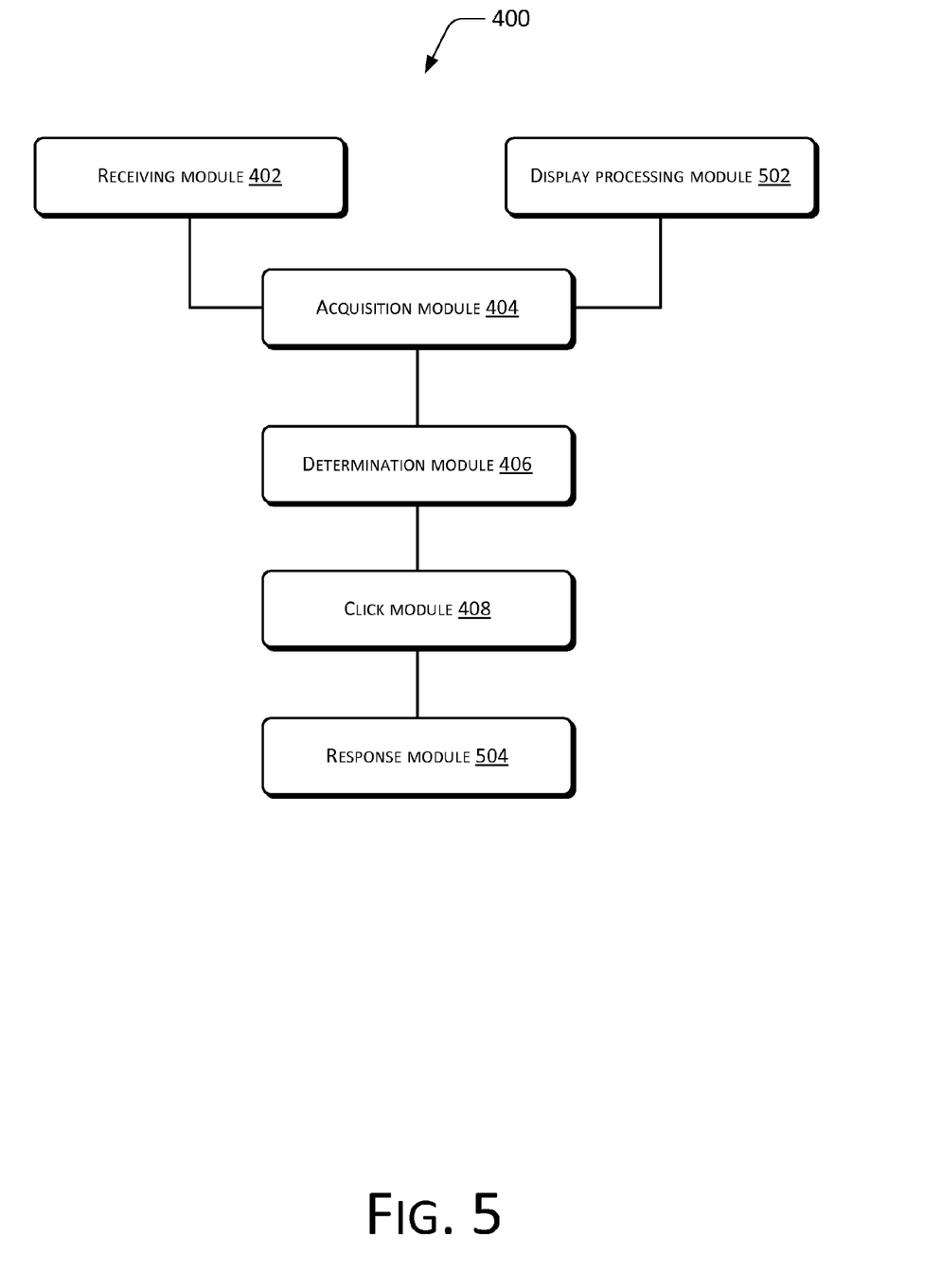
FIG. 5 is a schematic structural diagram of an apparatus of controlling a smart device according to another embodiment of the present disclosure.

In order to enable the user to acquire the image information corresponding to the triggered key of the control apparatus from the pre-stored correspondence relationship between the key and the image information, the apparatus 400 may further include a display processing module 502 as shown in FIG. 5. The display processing module 502 is configured to display a guide interface for setting the correspondence relationship, receive a key inputted by the user for an image that is selected in the guide interface, and store the correspondence relationship between the key and the image information of the image before the acquisition module 404 acquires the image information corresponding to the triggered key of the control apparatus. Additionally or alternatively, the display processing module 502 may be configured to display a guide interface for setting the correspondence relationship, the guide interface including an initial correspondence relationship between the key and the image information, receive an instruction from the user for modifying the initial correspondence relationship, and store a modified correspondence relationship between the key and the image information of the image. The display processing module 502 may facilitate the user to configure or modify a correspondence relationship between a key and image information of an image according to his/her needs, which meets the personalized needs of the user. The initial correspondence relationship may be a correspondence relationship automatically generated by the system, or may be a correspondence relationship that has been modified by the user previously.

If the image information includes a feature image only, the corresponding feature image may also be extracted from the current APP based on different feature extraction methods before the display processing module 502 stores a correspondence relationship between the key and the feature image, and then the correspondence relationship between the key and the feature image is stored.

If the image information includes a feature image and position information of the feature image on a screen of the smart device, the feature image and the position information of the feature image on the screen of the smart device may also be extracted from the current APP based on different feature extraction methods before the correspondence relationship between the key and the position information of the feature image on the screen of the smart device is stored.

It should be noted that the display processing module 502 may further acquire an identifier of a current application corresponding to the guide interface when storing the correspondence relationship between the key and the image information, and store the identifier of the current application when storing the correspondence relationship between the key and the image information of the image. By storing the identifier of the application, correspondence relationships between keys and respective image information of different applications may be distinguished.

The image corresponding to the image information in the correspondence relationship may include an image corresponding to a control object that is able to respond to a click event.

The click module 408 is configured to simulate a click event on the control object.

In addition, the apparatus 400 may further include a response module 504. The response module 504 is configured to respond to the click event after the click module 408 simulates the click event on the matched image.

For a process used by the apparatus 400 of controlling a smart device, which includes the receiving module 402, the acquisition module 404, the determination module 406 and the click module 408, to control the smart device, reference may be made to FIG. 1, which is not repeatedly described herein.

The example apparatus 400 of controlling a smart device receives a key signal of a triggered key that is sent by a control apparatus of the smart device via the receiving module 402. The acquisition module 404 obtains image information corresponding to the triggered key from a pre-stored correspondence relationship between the key and the image information based on the key signal. The determination module 406 determines a matched image from a currently displayed view according to the image information. The click module 408 simulates a click event on the matched image, thereby solving the problems regarding a touch-screen based application of a mobile terminal failing to support a joystick operation and the need of modification of the code of the application after the application is ported to a smart television system, thus reducing the cost of developing the application and enabling the user to control the application via the control apparatus.

Throughout this specification, reference terms such "an embodiment," "some embodiments," "an example," "a specific example," or "some examples," etc., means that a specific feature, structure, material, or characteristic described in connection with such embodiment or example is included in at least one embodiment or example of the present disclosure. Representations of the above terms in this specification do not necessarily refer to the same embodiment or example. Furthermore, the specific feature, structure, material or characteristic may be combined in any suitable manner in one or more embodiments or examples. In addition, one skilled in the art can combine different embodiments or examples described in the specification and features of different embodiments or examples when no conflict exists therebetween.

In addition, terms such as "first" and "second" are used for purposes of description only, and are not intended to indicate or imply relative importance or to imply a number of technical features that are indicated. Thus, features defined with "first" and "second" may explicitly or implicitly include at least one such feature. In the description of the present disclosure, "a plurality of" refers to at least two, for example, two, three, etc., unless expressly specified otherwise.

The description of any process or method in the flowcharts or in other forms of description herein may be understood as being indicative of including one or more modules, segments or parts for implementing the codes of executable instructions of method blocks in specific logic functions or processes. Moreover, the scope of the exemplary embodiments of the present disclosure includes other implementations, where the functions may be executed in an order different from those shown or discussed, including executing the functions according to related functions substantially in parallel or in a reverse order, which should be understood by one skilled in the art to which the embodiments of the present disclosure pertain.

The logics and/or method blocks shown in the flowcharts or in other forms of descriptions therein may be understood as a sequencing list of executable instructions for implementing logic functions, for example, which may be embodied in any computer-readable media, for use by a system, apparatus or device that executes the instructions (e.g., a computer-based system, a system including processor(s), or other systems capable of fetching and executing instructions from an instruction executing system, apparatus or device), or for use in combination with the instruction executing system, apparatus or device. As used herein, a "computer-readable media" may be any apparatus that is able to include, store, communicate, propagate or transmit a program for use by an instruction executing system, apparatus or device, or is able to be used in combination with the instruction executing system, apparatus or device. More detailed examples of the computer-readable media include (non-exhaustive list): an electrical connecting component (electronic apparatus) having one or more wirings, a portable computer disk (magnetic device), random access memory (RAM), read-only memory (ROM), an erasable programmable read-only memory (EPROM or flash memory), an optical fiber device, and a portable compact disk read-only memory (CDROM). Furthermore, a computer-readable media may be a paper or other appropriate media on which a program may be printed, because the program may be acquired electronically by optically scanning the paper or the other appropriate media and then compiling, interpreting, or processing in other appropriate manners when needed, for storage in the computer memory.

It should be understood that each part of the present disclosure may be implemented by hardware, software, firmware, or a combination thereof. In the foregoing embodiments, multiple method blocks or methods may be realized by software or firmware that is stored in memory and executed by a suitable instruction executing system. For example, if hardware is used for realization, any one of the following technologies that are known in the art or a combination thereof may be used for realization as in another implementation: a discreet logic circuit having a logic gate circuit for realizing logic functions of data signals, an application-specific integrated circuit having an appropriate combination of logic gate circuits, a programmable gate array (PGA), and a field programmable gate array (FPGA), etc.

One of ordinary skill in the art should understand that all or part of the method blocks of the methods in the foregoing embodiments may be performed by relevant hardware that is instructed by a program. The program may be stored in a computer readable storage media. When executing the program, one or a combination of the method blocks of the method embodiment is performed.

In addition, functional units in the embodiments of the present disclosure may be integrated in a single processing module. Alternatively, each unit may exist independently in a physical form. Or, two or more units may be integrated in a single module. The above-mentioned integrated module may be implemented in a form of hardware or in a form of a software functional module. If the integrated module is implemented in a form of a software functional module and is sold or used as an independent product, the integrated module may also be stored in a computer-readable storage media.

Figure 6:
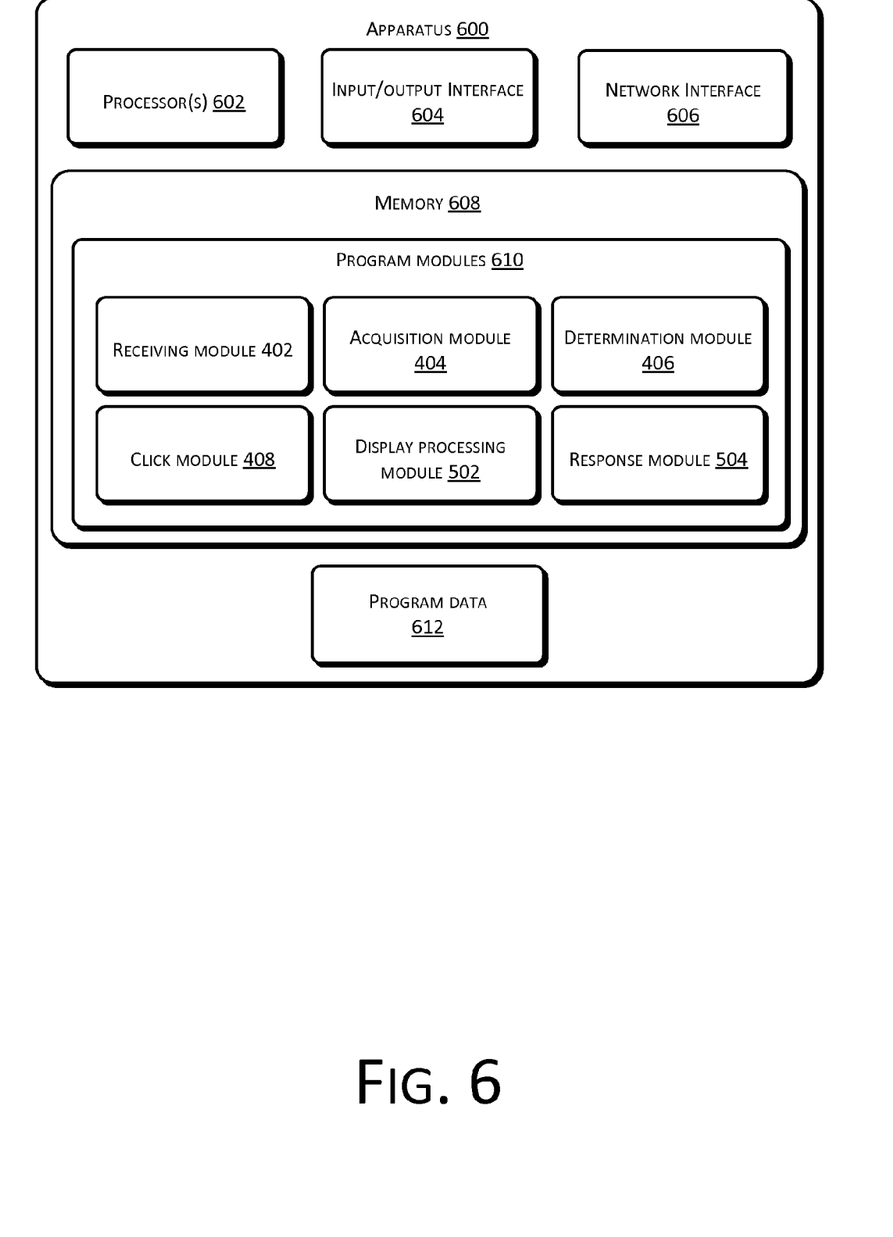
FIG. 6 is a structural diagram of the example apparatus as described in FIGS. 4 and 5 in more detail.

For example, FIG. 6 shows an example apparatus 600, as described in FIGS. 4 and 5, in more detail. In an embodiment, the apparatus 600 may include one or more processors (CPUs) 602, an input/output interface 604, a network interface 606 and memory 608.

The memory 608 may include a form of computer readable media such as volatile memory, Random Access Memory (RAM), and/or non-volatile memory, e.g., Read-Only Memory (ROM) or flash RAM, etc. The memory 608 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 608 may include program modules 610 and program data 612. The program modules 610 may include one or more modules as described in the foregoing embodiments. For example, the program modules 610 may include one or more of the receiving module 402, the acquisition module 404, the determination module 406, the click module 408, the display processing module 502 and the response module 504. Details of these modules have been described in the foregoing embodiments, and are therefore not repeatedly described herein.

The storage media mentioned above may be a read-only memory, a magnetic disk or an optical disk. Although the embodiments of the present disclosure have been shown and described above, it should be understood that the above embodiments are exemplary and shall not be construed as limitations of the present disclosure. One of ordinary skill in the art can made changes, modifications, replacements and variations in the embodiments without departing from the scope of the present disclosure.

What is claimed is:

1. A method implemented by one or more computing devices, the method comprising:
   porting a touch-screen based application to a smart device, the touch-screen based application having an application identifier;
   identifying, based on the application identifier, a pre-stored correspondence relationship of a plurality of pre-stored correspondence relationships between keys of a control apparatus of the smart device and image information, the plurality of pre-stored correspondence relationships generated based on a user preference or a user habit, the image information includes a feature image and position information of the feature image on a screen of the smart device; and
   converting a user input in the control apparatus to a click event simulated on a matched image by:
   receiving a key signal of a triggered key of the control apparatus sent by the control apparatus, the triggered key corresponding to the user input,
   in response to receiving the key signal, obtaining image information corresponding to the triggered key of the control apparatus from the identified pre-stored correspondence relationship between the triggered key and the image information based on the key signal,
   determining the matched image from a currently displayed view by the smart device based on the image information including obtaining an image at a corresponding position in the currently displayed view by the smart device based at least in part on the position information of the feature image and determining an image that is matched with the feature image in the obtained image, and
   simulating the click event on the matched image includes simulating the click event on a control object; and
   responding to the click event after the simulating the click event on the matched image.

2. The method of claim 1, wherein the image information comprises a feature image and wherein determining the matched image includes determining an image that is matched with the feature image from the currently displayed view based on at least in part on the feature image.

3. The method of claim 1, wherein: prior to obtaining the image information corresponding to the triggered key of the control apparatus, the method further comprises:
   displaying a guide interface for setting one or more correspondence relationships between images and keys;
   receiving at least one key input by a user for at least one image selected on the guide interface, the at least one key input selected based on the user preference of the user or the user habit of the user; and
   storing at least one correspondence relationship between the at least one key and respective image information of the at least one image.

4. The method of claim 1, wherein: prior to obtaining the image information corresponding to the triggered key of the control apparatus, the method further comprises:
   displaying a guide interface for setting one or more correspondence relationships, the guide interface comprising at least one initial correspondence relationship between at least one key and corresponding image information;
   receiving an instruction from a user for modifying the at least one initial correspondence relationship; and
   storing a modified correspondence relationship.

5. The method of claim 1, wherein an image corresponding to the image information in the identified pre-stored correspondence relationship includes an image corresponding to a control object that is able to respond to the click event.

6. An apparatus comprising:
   one or more processors; and
   memory, coupled to the one or more processors, the memory configured to store a plurality of modules executable by the one or more processors, the plurality of modules including:
   a receiving module configured to receive a touch-screen based application ported to a smart device and key signal of a triggered key sent by a control apparatus of the smart device, the touchscreen based application having an application identifier, the triggered key corresponding to a user input in the control apparatus;

an acquisition module configured to identify a pre-stored correspondence relationship of a plurality of pre-stored correspondence relationships between the triggered key and image information based on the application identifier and to obtain image information corresponding to the triggered key of the control apparatus from the identified pre-stored correspondence relationship based at least in part on the key signal in response to the receiving module receiving the key signal, the plurality of pre-stored correspondence relationships generated based on a user preference or a user habit and the image information includes a feature image and position information of the feature image on a screen of the smart device;

a determination module configured to; determine a matched image from a currently displayed view by the smart device based at least in part on the image information, obtain an image at a corresponding position in the currently displayed view by the smart device based at least in part on the position information of the feature image and determine an image that is matched with the feature image in the obtained image;

a click module configured to simulate a click event on the matched image includes to simulate the click event on a control object; and a response module configured to respond to the click event after the click module simulates the click event on the matched image.

7. The apparatus of claim 6, wherein the image information includes a feature image and wherein the determination module is further configured to determine an image that is matched with the feature image from the currently displayed view based at least in part on the feature image.

8. The apparatus of claim 6, wherein the plurality of modules further includes a display processing module configured to:

display a guide interface for setting one or more correspondence relationships, receive at least one key input by a user for an image selected on the guide interface, the one key input selected based on the user preference of the user or the user habit of the user, and store at least one correspondence relationship between the at least one key and image information of the selected image.

9. The apparatus of claim 6, wherein the plurality of modules further includes a display processing module configured to:

display a guide interface for setting one or more correspondence relationships, the guide interface comprising at least one initial correspondence relationship between at least one key and corresponding image information, receive an instruction from a user for modifying the at least one initial correspondence relationship, and store a modified correspondence relationship.

10. The apparatus of claim 6, wherein an image corresponding to the image information in the identified pre-stored correspondence relationship includes an image corresponding to a control object that is able to respond to the click event.

11. One or more non-transitory computer-readable media storing executable instructions that, when executed by one or more processors, cause the one or more processors to perform acts comprising:

porting a touch-screen based application to a smart device, the touch-screen based application having an application identifier:

identifying, based on the application identifier, a pre-stored correspondence relationship of a plurality of pre-stored correspondence relationships between keys of a control apparatus of the smart device and image information, the plurality of pre-stored correspondence relationships generated based on a user preference or a user habit and the image information comprises a feature image and position information of the feature image on a screen of the smart device; and converting a user input in the control apparatus to a click event simulated on a matched image by:

receiving a key signal of a triggered key of the control apparatus sent by the control apparatus, the triggered key corresponding to the user input, in response to receiving the key signal, obtaining image information corresponding to the triggered key of the control apparatus from the identified pre-stored correspondence relationship between the triggered key and the image information based on the key signal, determining the matched image from a currently displayed view by the smart device based on the image information includes obtaining an image at a corresponding position in the currently displayed view by the smart device based at least in part on the position information of the feature image and determining an image that is matched with the feature image in the obtained image, and simulating the click event on the matched image includes simulating the click event on the control object; and responding to the click event after the simulating the click event on the matched image.

12. The one or more non-transitory computer-readable media of claim 11, wherein, prior to obtaining the image information corresponding to the triggered key of the control apparatus, the acts further comprise:

displaying a guide interface for setting one or more correspondence relationships between images and keys;

receiving at least one key input by a user for at least one image selected on the guide interface, the at least one key input selected based on the user preference of the user or the user habit of the user; and storing at least one correspondence relationship between the at least one key and respective image information of the at least one image.

13. The one or more non-transitory computer-readable media of claim 11, wherein, prior to obtaining the image information corresponding to the triggered key of the control apparatus, the acts further comprise:

displaying a guide interface for setting one or more correspondence relationships, the guide interface comprising at least one initial correspondence relationship between at least one key and corresponding image information;

receiving an instruction from a user for modifying the at least one initial correspondence relationship; and storing a modified correspondence relationship.

14. The one or more non-transitory computer-readable media of claim 11, wherein an image corresponding to the image information in the identified pre-stored correspondence relationship includes an image corresponding to the control object that is able to respond to the click event.

* * * * *